United States Patent Office 3,655,589
Patented Apr. 11, 1972

3,655,589
FLAMEPROOFED ORGANIC SYNTHETIC RESINS
Frank Wingler, Leverkusen, Werner Dietrich, Cologne-Stammheim, Herbert Bartl, Odenthal-Hahnenberg, and Karl-Josef Kraft, Leverkusen, Germany, assignors to Farbenfabriken Bayer Aktiengesellschaft, Leverkusen, Germany
No Drawing. Filed Mar. 11, 1970, Ser. No. 18,760
Claims priority, application Germany, Mar. 27, 1969,
P 19 15 681.1
Int. Cl. C08g 53/10, 22/44; C08f 37/16
U.S. Cl. 260—2.5 FP                 2 Claims

ABSTRACT OF THE DISCLOSURE

Mixtures of 30 to 95% by weight of an organic synthetic resin and 5 to 70% by weight of a halogen-containing copolymer of 2 to 30% by weight of ethylene and/or propylene, α-butylene or isobutylene, 98 to 20% by weight of a halogen-containing α-olefin and, if desired, 0 to 40% by weight of an OH-containing copolymerizable monomer and 0 to 50% by weight of a halogen-containing telogen.

---

The present invention relates to flameproofed organic synthetic resins, if desired foam resins.

It is known to use halogen-containing substances as flameprotective agents for organic synthetic resins, particularly for foam resins. In order to obtain an adequate flameprotective effect, it is necessary to add sufficiently large quantities of halogen-containing substances to the synthetic resins. The halogen-containing flameprotective agents must be miscible with the synthetic resins and compatible with them and should not adversely alter the mechanical properties of the resins. Flame protection can be achieved, for example, by mixing the synthetic resins with low molecular weight hydrocarbons which contain halogen. When this method is employed, however, there is a risk of the flame protective agent migrating or diffusing out of the material in time so that the fire retarding action is lost. Moreover, when used in the quantities which are needed in order to obtain flame protection, the low molecular weight halogenated hydrocarbons usually impair the mechanical properties and they are not always sufficiently compatible in the mixtures.

There has therefore been no lack of attempts to use higher molecular weight halogenated hydrocarbons such as polyvinyl chloride or polyvinyl bromide for flameproofing organic synthetic resins. Higher molecular weight vinyl chloride or vinyl bromide polymers have, however, the disadvantage that at room temperature they are in a solid aggregated state. It requires powerful mechanical forces to mix them with synthetic resins or their precursors. Moreover, when used in quantities sufficient for flame protection, polyvinyl chloride or polyvinyl bromide considerably increase the viscosity of the mixtures or cause gelling. This in many cases renders further processing difficult or impossible. Furthermore, polyvinyl chloride has the great disadvnatage that it has only a limited compatibility wtih many organic precursors of synthetic resins, such as olefinic monomers or a polyisocyanates such as diphenylmethane diisocyanate or is even insoluble in other important synthetic resin precursors such as polyether polyols. In addition, polyvinyl chloride has only limited compatibility with the usual synthetic resins. As a result of these disadvantages, it is often not possible to obtain adequate flame protection with polyvinyl chloride.

It was therefore surprising that this difficulty can be overcome and flameproofed mixtures which have excellent compatibility can be prepared. Such flameproofed organic synthetic resins, if desired, in the form of foam resins, contain a mixture of 30 to 95% by weight of organic synthetic resins and 5 to 70% by weight of halogen-containing copolymers of:

(I) 2 to 30% by weight of ethylene and/or propylene, α-butylene or isobutylene,
(II) 98 to 20% by weight of a halogen-containing α-olefine and, if desired,
(III) 0 to 40% by weight of an OH-containing copolymerisable monomer and
(IV) 0 to 50% by weight of a halogen-containing telogen.

The sum of percentage contents is 100, the halogen content of the copolymers 40 to 80% by weight and the molecular weights of the copolymers 300 to 3000, preferably 300 to 1000.

Organic synthetic resins which may, if desired, be in the form of foams, are understood to mean, for example, the following substances:

(A) Polymers of α-olefinically unsaturated monomers, such as poly-α-olefines, e.g. polyethylene, polypropylene, polyisobutylene, ethylene-propylene copolymers, polybutadiene, polyisoprene, natural rubber, homo- and copolymers of vinyl acetate, such as ethylene vinyl acetate copolymers; polystyrenes, acrylonitrile-butadiene-styrene resins, polyacrylates, polymethacrylates, polyvinylchloride, polyfluoroelastomers, etc., preferably polyethylene, polystyrene, polyvinyl chloride, ethylene-propylene copolymers butadiene-acrylonitrile-styrene resins and vinyl acetate copolymers.

(B) Polyaddition and polycondensation products such as polyesters, polyepoxides, polyamides, polycarbonates, polyurethanes, polyisocyanurates, polyimides, polyureas, etc., preferably polyepoxides, polyurethanes, polyisocyanurates and polyesters.

The halogen-containing copolymers (telomers) consist of copolymerised units of:

(I) 2 to 30% by weight, preferably 10 to 25% by weight, of ethylene and/or propylene, α-butylene or isobutylene,
(II) 98 to 20% by weight, preferably 90 to 30% by weight, of a halogen-containing α-olefine, for example of the general formula:

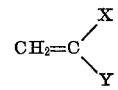

in which X represents a hydrogen, fluorine, chlorine or bromine atom, preferably a hydrogen, chlorine or bromine, and Y represents a fluorine, chlorine or bromine atom, preferably chlorine or bromine, and (III) 0 to 40% by weight, preferably 0 to 30% by weight, of an OH-containing monomer such as allyl alcohol, hydroxymethyl norbornene, dihydroxymethyl norbornene, acrylic or methacrylic acid hydroxyalkyl ester, allyl or vinyl ethers of polyfunctional alcohols, such as trimethylol propane monoallyl ether or glycerol monoallyl ether, glycerol monovinyl ether, methylvinylcarbinol, hydroxyalkyl esters of maleic or fumaric acid; preferably trimethylol propane monoallyl ether, glycerol monoallyl ether, glycol monovinyl ether and hydroxymethyl norbornene. The monomers detailed under III are used to improve the compatibility of the halogen-containing copolymers with synthetic resins.

(IV) 0 to 50% by weight, preferably 10 to 40% by weight, of a halogen-containing telogen such as carbon tetrachloride, chloroform, tetrachloroethylene, hexachloroethane, perchlorobicyclopentadiene, silicon tetrachloride, trichloroethanol, dichlorodiethyl ether, tetrabromoethane, tribromoethane, dibromoethane, tribromoethanol, tetrabromocyclooctane, hexabromocyclododecane, monobromotrichloromethane, dichlorodifluoromethane, monofluorotrichloromethane, preferably carbon tetrachloride, chloroform, bromoform and tetrabromomethane.

The sum of the percentage contents is 100, the halogen content of the copolymers 40 to 80% by weight and the molecular weights of the copolymers (telomers) 300 to 3000, preferably 300 to 1000.

The initiators used for telomerisations may be organic peroxide and azo compounds which decompose into radicals, e.g. benzoyl peroxide, p-chlorobenzoyl peroxide, cumene peroxide, lauroyl peroxide, tertiary butyl hydroperoxide, tertiary butyl peroctoate and azo diisobutyric acid dinitrile. The polymerisation temperatures are between about 20° C. and 150° C.

The following initiators with which polymerisation may be carried out at temperatures of between 20° C. and 60° C. have proved to be particularly useful: dicyclohexyl peroxydicarbonate, diisopropyl sulphonyl peracetate, tertiary butyl perpivalate and 2,6-dichlorobenzoyl peroxide. The last mentioned initiators have the further advantage of yielding colourless copolymers.

The halogen-containing copolymers (telomers) may be prepared by solution, bulk or precipitation polymerisation using radical forming initiators in the presence of compounds which regulate the molecular weight. Examples of preparation of such copolymers may be found in the experimental part of this application and of German application P 19 15 682.2 and U.S.A. patent specification 2,440,800.

The halogen-containing copolymers described (telomers) are soluble in practically all the usual synthetic resin precursors, e.g. in the olefinically unsaturated monomers styrene, acrylonitrile, vinyl acetate, acrylates, butadiene, chlorobutadiene and isoprene, in polyisocyanates, polyepoxides and polyesters, and are compatible with many organic polymers such as polyethylene, polypropylene, elastomers based on acrylates, butadiene, isoprene, chlorobutadiene, styrene and acrylonitrile, polycarbonates, polyesters, polyamides, polyepoxides, polyurethanes, polyisocyanurates and polyurea compounds, so that sufficient quantities can be incorporated for flameproofing without the mechanical properties being adversely affected.

The copolymers described (telomers) are in addition liquid to viscous or of the consistency of vaseline at room temperature and can therefore be easily mixed with synthetic resins or their precursors. Both when used alone or in combination with synergistically acting flame protective agents, they reduce the inflammability and prevent smoldering. In order to provide good compatibility with organic synthetic resins or their precursors and to ensure adequate fire retarding effect, the copolymers should have a molecular weight of 300 to 3000, preferably 300 to 1000 and a halogen content of 40 to 80% by weight. Copolymers which have a lower halogen content should be chlorinated before they are used as flame protective agents.

It is particularly advantageous to use polymers which have been prepared by telomerisation of ethylene and/or propylene, isobutylene or α-butylene with vinyl chloride, vinylidene chloride, vinyl bromide or vinylidene bromide in the presence of a halogen-containing telogen. The telogen may at the same time serve as solvent. The solvent should dissolve both the monomer and the polymer. The length of the polymer chain and hence the molecular weight can be controlled by temperature control and by regulating additives. Transfer reactions and chain breaking reactions may take place with the solvent and the monomers and telogens in the course of the polymerisation. The halogen-containing copolymers may therefore contain fractions of the solvent or the regulating additives at the beginning or end of the chain. Definite end groups which improve the compatibility may therefore be incorporated in the polymer via the telogen. Thus, for example, trichloromethyl end groups introduced via the telogen carbon tetrachloride impart excellent compatibility with polyurethane systems. Bromine-containing telogens which enable a particularly flame protection effect to be achieved can also be obtained quite simply by telomerising in the presence of bromine-containing telogen. The advantage of the low molecular weight, halogen-containing copolymers described over the known halogenated paraffin oils in thus that optimum compatibilities and fire retarding effects can be obtained by choice of the telogen and of an OH-containing comonomer. Telomers with the comonomer trimethylol propane monoallyl ether of OH number 100 and chlorine content 44% by weight, for example, are homogeneously miscible with polyether polyols, whereas chlorinated paraffin oils are not.

The preferred telomers which are composed of components I to IV have the following composition, in which the sum of the percentages is always 100:

(I) 10 to 25% by weight of ethylene and/or propylene, α-butylene or isobutylene,
(II) 90 to 30% by weight of a halogen-containing α-olefine,
(III) 5 to 30% by weight of an OH-containing copolymerisable monomer,
(IV) 10 to 40% by weight of a halogen-containing telogen.

To provide organic synthetic resins with a difficulty inflammable or self-extinguishing finish, 5 to 70% by weight of the halogen-containing copolymers, based on the quantity of mixture, are added to the organic synthetic resins. They may be mixed with thermoplastically workable resins in solution or by incorporation using rollers, kneaders, mixers, extruders or screws. Additives such as stabilisers, fillers pigments, auxiliary agents for working up and additions of known flame protective substances may be incorporated in the process.

The fire retarding effect of the halogen-containing copolymers (telomers) can be further improved by synergistically active additives. Up to 50% by weight, based on the halogen-containing copolymers, e.g. of derivatives of phosphorus, such as trichloroethyl phosphate, trichloroethyl phosphite, tribromoethyl phosphate, tri-2-chloropropyl phosphate, condensation products of phosphoric or phosphorous acid with polyols, or addition products of triphenyl phosphine with metal halides may be used for the purpose.

Derivatives of antimony, such as antimony oxides or triphenyl antimony, elementary phosphorus or sulphur, radical forming substances such as organic peroxides, organic azo compounds or substances which trap radicals, such as hydroquinone derivatives, sulphonamides, hydrazones, disulphides or quinone imides.

In many cases, it is unnecessary to add a synergistically active flame prospective agent because owing to the good compatibility of the halogen-containing copolymers described, sufficient quantities of these can be incorporated for flameproofing.

Polyvinyl chloride is itself flameproof but the flame resistance may be lost on addition of plasticisers. If, however, the halogen-containing copolymers described are used as plasticisers, self-extinguishing soft PVC is obtained even at high plasticiser concentrations. Flameproofed soft PVC may contain, for example, 10 to 45% by weight of the halogen-containing telomers described in addition to the usual stabilisers, lubricants and fillers.

To prepare flameproof polyester resins or polyepoxides, the halogen-containing telomers are mixed with the starting materials before the hardening process, e.g. they may be added to the mixture of monomeric styrene with polyesters of maleic acid or diglycidyl ether of bisphenol A with methylhexahydrophthalic acid, and hardening is then carried out in the usual manner using the usual catalysts. For example, 20 to 30% by weight of halogen-containing telomer having a chlorine content of 58% by weight is generally sufficient to prevent hardened casting resins from smouldering without exposure to an external flame. Synergistically active flameproofing agents such as antimony trioxide may, of course, be added in order to improve the fire retarding effect.

Elastomers with a flameproof finish are obtained by working the copolymers described together with the usual additives and vulcanising agents, into the usual elastomers such as natural rubber, polybutadiene, polyisoprene, copolymers of butadiene with styrene or acrylonitrile, polyisobutylene, ethylene-propylene copolymers, polyacrylates, polyfluoro elastomers or ethylene-vinyl acetate copolymers before vulcanisation, using rollers or internal mixers.

The halogen-containing copolymers described above are used particularly advantageously for improving the flame resistance of foam resins. These copolymers can be used to give a fire retarding finish to foams of polystyrene or styrene copolymers, polyurethanes, polyureas, polyisocyanurates and polyimides.

To prepare flameproofed polystyrene foams, the halogen-containing copolymer may be dissolved in monomeric styrene or mixtures of styrene and polystyrene and then worked up by known polymerisation processes into an expandable granulate.

It is here that the main advantage over polyvinyl chloride is seen. Polyvinyl chloride is only soluble to a limited extent in styrene and cannot be added to the monomers in a sufficient quantity before the styrene polymerisation. The halogen-containing copolymers described, on the other hand are homogeneously miscible with monomeric styrene in any proportion. In addition, the halogen-containing copolymer may be added to the polystyrene granulate after polymerisation by incorporation using rollers, screws, mixers or extruders. After introduction of a blowing agent, flameproofed expandable polystyrenes are obtained.

The fire retarding effect can be reinforced by synergistically active additives as mentioned above. The halogen-containing copolymers are preferably used in such quantities that the expandable polystyrene granulates contain 1 to 20% of halogen. A bromine content of only 5% already imparts flame protection when telomers containing 20 to 50% by weight of bromine are used, particularly if synergistically active flame protective agents are also added. The flameproofed expandable polystyrene granulates are then blown up to give foams by known processes. When a gas flame is smoothly removed from the foams, they extinguish within a few seconds. Insufficiently flameproofed mouldings, on the other hand, burn down completely after removal of the flame.

The good compatibility of the halogen-containing telomers with the starting materials for the production of foams based on polyurethanes, polyureas, polyimides and polyisocyanurates as well as with set foams make the halogen-containing copolymers particularly suitable for flameproofing foams resin based on polyisocyanates. The telomers described above are miscible in any proportion with polyisocyanates such as toluylene diisocyanate, dimerised toluylene diisocyanate, diphenylmethane diisocyanate, naphthalene diisocyanate, triphenylmethane triisocyanate, hexamethylene diisocyanate, isophorone diisocyanate, their derivatives such as the prepolymers prepared with polyols, dimerisation or trimerisation products, and do not cause gelling. The mixtures have viscosities of 5 to 100,000 cp. at 20° C. and can be worked up by the conventional processes for the production of foams.

In addition, the above described OH-containing telomers having OH numbers of 20 to 200 are homogeneously miscible with polyester and polyether polyols based on adipic acid, terephthalic acid, polyols such as propanediol, butane diol, glycerol, trimethylol propane or ethylene diamine, ammonia, pentaerythritol, sorbitol, sucrose, starch and its degradation products and ethylene oxide and propylene oxide.

The good compatibility of the halogen-containing copolymers (telomers) described above is surprising since chlorinated paraffins or polyvinyl chlorides have only a limited solubility or compatibility with the above mentioned monomers are used for the production of foam resins. Commercial suspension polyvinyl chloride will only dissolve to an extent of about 10% by weight in diphenylmethane diisocyanate and immediately precipitates on addition of polyols. Although suspension polyvinyl chloride is soluble in toluylene diisocyanate, the solutions gel and cannot be worked up to give a foam resin by the conventional processes. The constituents of the system separate after the incorporation of polyols based on polyethers. The halogen-containing telomers described, on the other hand, can be mixed in any proportion, for example with toluylene-2,4-diisocyanate or -2,6-diisocyanate or diphenylmethane - 4,4' - diisocyanate to yield mixtures which can be poured at room temperature and which do not separate into their constituents after the addition of polyols.

It was feared that the halogen-containing telomers would exert a plasticising influence after the mixtures had been worked up into foams and would thus impair the mechanical and thermal properties. It was astonishing that no significant deterioration of the mechanical or thermal properties was observed up to a telomer content of 33% by weight in hardened foam resins based on polyurethane, polyisocyanurates, polyureas or polyimides. This finding is very important because it means that the halogen-containing telomers described may be incorporated in the foams in a quantity sufficient to provide flame protection without causing any deterioration in the mechanical properties.

In order to achieve sufficient flame protection, the halogen-containing telomers are added to the foam mixtures in quantities so that the finished foam contains about 15 to 25% by weight of chlorine in cases where chlorine-containing telomers are used and 3 to 15% by weight of bromine in cases where bromine-containing telomers are used. The halogen content may be lower when synergistically active flame protective agents are used. 10 to 15% by weight of chlorine or 2 to 10% by weight of bromine are then sufficient. Preferred synergistic additives are up to 50% by weight, based on the telomer, of trichloroethyl, phosphite, diethyldiethanolaminomethyl phosphoric acid ester and antimony trioxide.

The foams are prepared by conventional methods from polyols and polyisocyanates, using emulsifiers, stabilisers, activators and blowing agents. The blowing agents used may be either water or low boiling organic halogen compounds such as trifluoromonochloromethane. The halogen-containing telomers are added before foaming either to the polyisocyanate or to the polyol. It is preferred to use telomers which have a chlorine content of 50 to 60% by weight which have been prepared by telomerisation in the presence of carbon tetrachloride, telomers of OH number 40 to 200 prepared by cotelomerisation with trimethylol propane monoallyl ether, and telomers which contain up to 40% by weight of bromine in addition to chlorine.

The percentages given in the following disclosure are percentages by weight unless otherwise indicated.

Preparation of the chlorine-containing copolymers (telomers)

Copolymer 1.—360 cc. of toluene, 200 g. of ethylene, 200 g. of vinylidene chloride and 5 g. of di-tertiary butyl peroxide are introduced into a 1.5 litre autoclave under nitrogen. The contents are heated to 130° C. for 12 hours with stirring and then freed from solvent in a rotary evaporator. After thin layer evaporation at 120° C. and 1 mm. Hg, 180 g. of an oil containing 58% by weight of chlorine remains behind. The average molecular weight measured with a membrane osmometer in dimethyl formamide is 1100. The copolymer contains copolymerised units of 80.5% of vinylidene chloride and 19.5% of ethylene.

Copolymer 2.—In a manner analogous to that described for copolymer 1, 200 g. of ethylene, 175 g. of vinyl chloride, 4 g. of ditertiary butyl peroxide and 2 g. of dodecylmercaptan are polymerised in 360 cc. of toluene for 12 hours at 120° C. and the product is worked up as described for copolymer 1. 190 g. of an oil of viscosity number 0.06 dl./g. measured at 25° C. in cyclohexanone and having a chlorine content of 40% by weight are obtained. The average molecular weight measured by osmometry is 750. The copolymer contains copolymerised units of 71.5% of vinyl chloride and 28.5% of ethylene.

In order to increase the chlorine content, the compound may subsequently be chlorinated to a chlorine content of 60% by weight in carbon tetrachloride solution in the presence of 1% by weight of benzoyl peroxide.

Copolymer 3.—The reaction mixture is prepared in the same way as for copolymer 2 but in addition 30 g. of hydroxymethyl norbornene are added. An oil of OH number 27 is obtained. Molecular weight 800. The copolymer contains copolymerised units of 80% of vinyl chloride, 6.3% of hydroxymethyl norbornene and 13.7% of ethylene. Chlorine content: 45%.

Copolymer 4.—The same reaction mixture as for the preparation of copolymer 2 is used with the addition of 20 g. of methyl vinyl carbinol. An oil of OH number 10 containing 45% by weight of chlorine is obtained. Molecular weight 650. The copolymer contains copolymerised units of 80.3% of vinylchloride, 3% of methyl vinyl carbinol and 16.7% of ethylene.

Copolymer 5.—The same reaction mixture as for the preparation of copolymer 2 is used with the addition of 20 g. of allyl hydroxypropanol. Again 190 g. of an oil of OH number 10 and having a chlorine content of 40.4% are obtained. Molecular weight 600. The copolymer contains copolymerised units of 72% vinyl chloride, 2.6% of allyl hydroxypropanol and 25.4% of ethylene.

Copolymer 6.—The same reaction mixture as for the preparation of copolymer 2 is used with the addition of 30 g. of hydroxypropyl methacrylate. An oil of OH number 16 and chlorine content 52% by weight is obtained. Molecular weight 630. The copolymer contains copolymerised units of 92.5% of vinyl chloride, 4% of hydroxypropyl methacrylate and 3.5% of ethylene.

Copolymer 7.—3 litres of carbon tetrachloride, 1 kg. of vinyl chloride and 16 g. of cyclohexylperoxydicarbonate are introduced into a 10 litre autoclave. Ethylene is forced in at room temperature (10 atmospheres) and the reaction mixture is heated to 50° C. The pressure is kept constant at 24 atmospheres for 12 hours. The solvent is then removed in a rotary evaporator and the residue is treated in a thin layer evaporator at 120° C. and 1 mm. Hg. 1.542 kg. of a viscous oil of molecular weight 600 (measured with a Mechrolab osmometer is acetone) are obtained. The chlorine content is 59%. The copolymer contains copolymerised units of 60% vinyl chloride, 14.3% of ethylene and 25.7% of carbon tetrachloride as telogen.

Copolymer 8.—2.5 litres of toluene, 500 g. of carbon tetrabromide, 1 kg. of vinyl chloride and 20 g. of cyclohexylperoxydicarbonate are polymerised in a 10 litre autoclave at an ethylene pressure of 22 atmospheres for 12 hours at 50° C. and worked up as described for copolymer 7. 800 g. of an oil which has a bromine content of 47% by weight and chlorine content of 25.9% by weight are obtained. Molecular weight 690. The copolymer contains copolymerised units of 46% of vinyl chloride, 6% of ethylene and 48% of carbon tetrabromide as telogen.

Copolymer 9.—The following mixture is polymerised in a 3 litre autoclave for 12 hours with stirring under an ethylene pressure of 25 atmospheres: 500 cc. of vinyl bromide, 200 g. of bromoform, 1000 cc. of carbon tetrachloride, and 10 g. of cyclohexylperoxydicarbonate. After the usual working up, 650 g. of a viscous oil which has a bromine content of 75% by weight are obtained. Molecular weight 700. The copolymer contains 55% of vinyl bromide, 9% of ethylene and 55% of bromoform as telogen.

EXAMPLE 1

30 parts by weight of copolymer 7 are mixed on a roller at 160° C. with 70 parts by weight of low pressure polyethylene (density 0.97 g./cm.$^3$) and 1 part by weight of the stabiliser 4,4' - thio-bis-(6-tertiarybutyl-3-methylphenol) and drawn from the roller as a 2 mm. thick sheet. When a sheet measuring 0.2 x 10 x 30 cm. is made to catch fire in the flame of a Bunsen burner, and then smoothly removed from the flame, it extinguishes within 5 seconds.

EXAMPLE 2

30 parts by weight of copolymer 7 are rolled on rollers at 100° C. with 70 parts by weight of a vinyl chloride ethylene copolymer [containing 10% by weight of combined ethylene and 90% by weight of combined vinyl chloride, K-value 70] and 3 parts by weight of dibutyl tin dilaurate, and the mixture is rolled out into a sheet 1 mm. in thickness. When a sample strip measuring 10 x 30 x 0.2 cm. is removed from a Bunsen burner flame 4 cm. in height, it extinguishes within 2 seconds.

EXAMPLE 3

70 parts by weight of commercial suspension polyvinyl chloride of the K-value 60 are mixed with 30 parts by weight of copolymer 7 and 1 part by weight of dibutyl tin dilaurate on rollers heated to 160° C. and drawn off the rollers in the form of a sheet and pressed at 150° C. to form a plate measuring 1 x 100 x 100 mm. The plate extinguishes immediately after removal from a flame.

EXAMPLE 4

100 parts by weight of polystyrene granulate (molecular weight about 250,000) are mixed with 20 parts of copolymer 7 and 5 parts by weight of antimony trioxide at 160° C. on a roller and made up into a sheet measuring 0.1 x 10 x 30 cm. When a test strip is made to catch fire in a flame 4 cm. in height and then gently moved out of the flame, it extinguishes within 2 seconds.

EXAMPLE 5

80 parts by weight of a mixture of 30% by weight of a polyester resin of 1.35 mols of 1,3-butylene glycol, 0.5 mol of maleic acid anhydride and 0.9 mol of phthalic acid anhydride and 70% by weight of styrene are hardened at 90° C. with 20 parts by weight of copolymer 7 and 5 parts by weight of antimony trioxide and with 0.5 part by weight of benzoyl peroxide paste. A sample of this extinguishes instantaneously after it has caught fire in a Bunsen burner flame.

EXAMPLE 6

19 parts by weight of diglycidyl ether of bisphenol A (equivalent weight 190), 14.3 parts by weight of methylhexahydrophthalic acid anhydride, 33 parts by weight of copolymer 7 and 0.2 part by weight of dimethylbenzylamine are hardened at 120° C. for 24 hours. Mouldings from this material do not continue to burn outside a flame.

EXAMPLE 7

16.5 parts by weight of diglycidyl ester of hexahydrophthalic acid (equivalent weight 165), 14.3 parts by weight of 4-methylhexahydrophthalic acid anhydride and 31 parts by weight of copolymer 7 and 0.2 part by weight of dimethyl benzylamine are hardened at 120° C. for 24 hours. Mouldings from this material do not continue to burn outside the flame.

EXAMPLE 8

75 parts by weight of copolymer 7 are dispersed with 70 parts by weight of polystyrene (average molecular weight 250,000) and 100 parts by weight of styrene, 1 part by weight of benzoyl peroxide in 100 parts by weight of a 2% aqueous polyvinyl alcohol solution. The reaction mixture is polymerised for 12 hours at 80° C. under nitrogen and the pearl polymer is isolated, dried and left to swell in 10% by weight of pentane for 24 hours. The expandable polystyrene is blown up in a mould with steam. Samples measuring 0.5 x 15 x 10 cm. extinguish within 5 seconds after removal from a flame. Without addition of halogen-containing copolymer, the samples burn down completely.

EXAMPLE 9

Telomer 7 was mixed in various proportions by weight with liquid diphenylmethane diisocyanate. The viscosities of the mixtures are shown in Table I.

TABLE I.—VISCOSITIES OF THE MIXTURES WITH DIPHENYLMETHANE DIISOCYANATE

| Percent by weight of Telomer 7 | 30 | 50 | 67 |
|---|---|---|---|
| Viscosities measured at 25° C. in cp | 1,720 | 15,501 | 114,896 |

EXAMPLE 10

Telomer 7 is mixed in various proportions with toluylene diisocyanate. The viscosities of the mixtures are shown in Table II.

TABLE II.—VISCOSITIES OF THE MIXTURES WITH TOLUYLENE DIISOCYANATE

| Percent by weight of Telomer 7 | 15 | 30 | 50 | 55 |
|---|---|---|---|---|
| Viscosity measured at 25° C. in cp | 6.4 | 13.7 | 94 | 123 |

EXAMPLE 11

The mixtures prepared in Example 9, in amounts that in each case 100 parts by weight of diphenylmethane diisocyanate are contained, are foamed with 90 parts by weight of a sucrose polyether of OH number 370 and 1 part by weight of N,N-di-$\beta$-hydroxyethylaminomethyl phosphonic acid diethyl ester, 45 parts by weight of trichloromonofluoromethane, 1 part by weight of a silicon stabiliser and 4 parts by weight of N-methyl-N-ethyl-dimethylamino piperazine and hardened at room temperature for one hour. The mechanical properties of the foams are shown in Table III.

TABLE III

| Percent by weight of Telomer 7 in diphenylmethane diisocyanate | 0 | 30 | 50 | 67 |
|---|---|---|---|---|
| Bulk density, kg./m.$^3$ | 25 | 30 | 45 | 80 |
| Compression strength, kg./cm.$^2$ | 1.4 | 1.2 | 1.8 | 2.8 |
| Heat bending resistance, ° C | 100 | 103 | 120 | 100 |

The fire resistance of the foams is shown in Table IV. The length of burning path and torch time were determined according to ASTM 1692.

TABLE IV

| Percent by weight of Telomer 7 in diphenylmethane diisocyanate | 0 | 30 | 50 | 67 |
|---|---|---|---|---|
| Bulk density, kg./m.$^3$ | 25 | 30 | 45 | 80 |
| Length of burning path, mm | 64 | 34 | 25 | 22 |
| Torch time, sec | 130 | 130 | 150 | 230 |

EXAMPLE 12

144 g. of a mixture of 55 parts by weight of a telomer having a chlorine content of 59% by weight prepared from polyvinyl chloride, propylene and carbon tetrachloride in a manner analogous to copolymer 7 using 45 parts by weight of toluylene diisocyanate are foamed with 100 parts by weight of a sucrose polyether of OH number 300 (addition product of sucrose and propylene oxide), 40 parts by weight of trichloromonofluoromethane, 0.7 part by weight of water, 0.5 part by weight of diazabicyclooctane and 1 part by weight of silicone stabiliser. The foam has a bulk density of 27 kg./m.$^3$ and a compression strength of 0.9 kg./cm.$^2$.

EXAMPLE 13

50 g. of a mixture of 50 parts by weight of a telomer of trimethylol propane monoallyl ether, vinyl chloride, carbon tetrachloride and ethylene of OH number 120 having a chlorine content of 46% by weight and 50 parts by weight of diphenylmethane diisocyanate are mixed with 50 g. of a sorbitol polyether of OH number 420 (addition product of sorbitol and propylene oxide) and foamed using 20 g. of trichloromonofluoromethane, 1,5-diazabicyclooctane, 1 g. of silicon stabiliser and 44 g. of a commercial isomeric mixture of diphenylmethane diisocyanate. The bulk density is 27 kg./m.$^3$, the compression strength 1.3 kg./cm.$^2$. The foam is non-combustible according to ASTM 1692.

EXAMPLE 14

12 parts by weight of copolymer 1 are mixed with 13 parts by weight of diphenylmethane diisocyanate (commercial isomeric mixture) and the mixture is foamed with 6 parts by weight of trichloromonofluoromethane, 10 parts by weight of a polyester-polyol mixture of OH number 430 and having a water content of 2% by weight. The foam is non-combustible according to ASTM 1692.

The polyester of the used mixture is a condensation product of 1 mol adipic acid, 2.6 mols phthalic acid anhydride, 1.3 mols oleic acid and 6.9 mols of trimethylol propane. The polyol is an addition product of propylene oxide and trimethylol propane having an average molecular weight of 450 and an OH number of 380.

EXAMPLE 15

5 parts by weight of copolymer 8 are mixed with 12 parts by weight of a commercial isomeric mixture of diphenylmethane diisocyanate and 1 part by weight of antimony trioxide and the mixture is foamed as described in Example 14. A sample extinguishes instantaneously outside a flame.

EXAMPLE 16 (Comparison with Example 17)

6 parts by weight of an aminated Novolak of the structure:

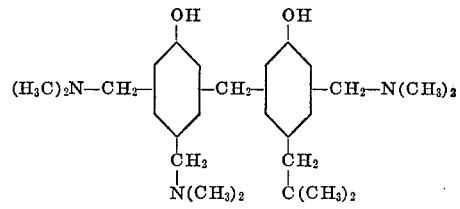

are mixed with 2 parts by weight of a siloxane stabiliser (polysiloxane-polyether-copolymer) and 15 parts by weight of monofluorotrichloromethane, and 100 parts by weight of crude diphenylmethane-4,4'-diisocyanate are then added. The mixture is intensively stirred for a few seconds and poured into prepared paper moulds. A fine cellular hard foam is obtained in less than 2 minutes.

Properties of the foam:
   Bulk density: 33 kg./m.$^3$
   Compression strength: 2.1 kg. wt./cm.$^2$
   Heat bending resistance: 227° C.
   Burning down time in torch test: 18 minutes.

EXAMPLE 17

In a manner analogous to Example 16, 50 parts by weight of the diphenylmethane-4,4'-diisocyanate used are replaced by 50 parts by weight of a solution of 40 parts by weight of telomer 7 and 100 parts by weight of crude diphenylmethane-4,4'-diisocyanate.

Properties of the foam:
   Bulk density: 33 kg./m.$^3$
   Compression strength: 1.8 kg. wt./cm.$^2$
   Heat bending resistance: 220° C.

Time for burning down in the torch test 42 minutes. The flameproofed organic synthetic resins of Examples 1 to 17 show after six months no sweating of the telomers i.e. of the relatively low molecular weight halogene containing copolymers.

We claim:
1. A flameproofed foamed composition comprising a mixture of 30 to 95% by weight of an organic synthetic resin selected from the group consisting of polyepoxide, polyurethane, polyisocyanurate and polyester and 5 to 70% by weight of a halogen-containing copolymer consisting of

(I) 10 to 25% by weight of ethylene, propylene, α-butylene or isobutylene;
(II) 90 to 30% by weight of vinyl chloride, vinylidene chloride, vinyl bromide or vinylidene bromide;
(III) 5 to 30% by weight of trimethylolpropane monoallyl ether, hydroxypropyl methacrylate, hydroxymethylnorbornene, glycol monovinyl ether or glycerol monoallyl ether and
(IV) 10 to 40% by weight of carbon tetrachloride, chloroform, bromoform or tetrabromoethane;

the halogen content of said copolymer being 40 to 80% by weight, the molecular weight of said copolymer being from 300 to 3000 and the OH-number thereof being 40 to 200.

2. The flameproofed composition of claim 1 wherein said synthetic resin is polyurethane, component I is ethylene, component II is vinyl chloride, component III is trimethylolpropane monoallyl ether and component IV is carbon tetrachloride.

References Cited
UNITED STATES PATENTS

| | | | |
|---|---|---|---|
| 2,779,754 | 1/1957 | Erchak | 260—28.5 D |
| 2,440,800 | 5/1948 | Hanford et al. | 260—94.8 |
| 3,067,149 | 12/1962 | Dombrow et al. | 260—2.5 AJ |

SAMUEL H. BLECH, Primary Examiner

W. T. BRIGGS, SR., Assistant Examiner

U.S. Cl. X.R.

260—2.5 AJ, 2.5 AW, 2.5 EP, 2.5 HA, 2.5 HB, 2.5 N, 33.8 UA, UB, EP, 45.7 P, S, 45.75 R, 80.75, 28.5 D, 656 R, 658 R, 836, 859, 873, 899, Dig. 24